(12) United States Patent
Kilmer

(10) Patent No.: US 7,374,827 B2
(45) Date of Patent: May 20, 2008

(54) RECOVERED HIGH STRENGTH MULTI-LAYER ALUMINUM BRAZING SHEET PRODUCTS

(75) Inventor: Raymond J. Kilmer, Lancaster, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 11/248,531

(22) Filed: Oct. 12, 2005

(65) Prior Publication Data

US 2006/0078728 A1 Apr. 13, 2006

Related U.S. Application Data

(60) Provisional application No. 60/618,637, filed on Oct. 13, 2004.

(51) Int. Cl.
*B32B 15/20* (2006.01)
*B23K 20/04* (2006.01)
*F28F 21/08* (2006.01)

(52) U.S. Cl. .............. 428/654; 428/933; 148/523; 148/535; 228/235.2; 228/262.51; 165/905

(58) Field of Classification Search ............. None
See application file for complete search history.

(56) References Cited

U.S. PATENT DOCUMENTS

| | | | | | |
|---|---|---|---|---|---|
| 3,994,695 | A | * | 11/1976 | Setzer et al. ............... | 428/654 |
| 5,021,106 | A | * | 6/1991 | Iwai et al. .................. | 148/437 |
| 5,125,452 | A | * | 6/1992 | Yamauchi et al. .......... | 165/133 |
| 2005/0067066 | A1 | * | 3/2005 | Tanaka et al. .............. | 148/535 |
| 2006/0105193 | A1 | * | 5/2006 | Burger et al. ............... | 428/654 |

FOREIGN PATENT DOCUMENTS

| | | | |
|---|---|---|---|
| EP | 0799667 A1 | * | 10/1997 |
| JP | 03-260029 | * | 11/1991 |
| SE | 9604458 | * | 10/1997 |
| WO | WO 03/089237 A1 | * | 10/2003 |
| WO | WO 2006/043137 A1 | * | 4/2006 |

* cited by examiner

*Primary Examiner*—John J Zimmerman
(74) *Attorney, Agent, or Firm*—Greenberg Traurig LLP; Peter J. Borghetti

(57) ABSTRACT

A metallurgical product consists essentially of a core aluminum alloy, purposefully tailored through chemistry and processing route to resist recrystallization during the brazing cycle to intentionally exploit the higher strengths immediately after brazing of a deformed and recovered microstructure, the core aluminum alloy being bonded on one side to an aluminum alloy interliner designed to be resistant to localized erosion, which, in turn, is bonded to a 4xxx calling alloy.

28 Claims, 3 Drawing Sheets

| Brazing Alloy Cladding |
|---|
| Interliner |
| Core processed to be highly resistant to recrystallization during braze cycle (e.g. Non homogenized 3xxx alloy) |

Example 1. Three-Layer Clad Composite

| Brazing Alloy Cladding |
|---|
| Interliner 1 |
| Core processed to be highly resistant to recrystallization during braze cycle |
| Interliner 2 |
| Outerliner Alloy Cladding |

Example 2. Five-Layer Clad Composite

| Brazing Alloy Cladding |
|---|
| Interliner |
| Core processed to be highly resistant to recrystallization during braze cycle |
| Outerliner Alloy Cladding |

Example 3. Four-Layer Clad Composite

Examples of Variants of Multi-Layer Non-Homogenized-Core Clad Products

| Brazing Alloy Cladding |
| --- |
| Interliner |
| Core processed to be highly resistant to recrystallization during braze cycle (e.g. Non homogenized 3xxx alloy) |

Example 1. Three-Layer Clad Composite

| Brazing Alloy Cladding |
| --- |
| Interliner 1 |
| Core processed to be highly resistant to recrystallization during braze cycle |
| Interliner 2 |
| Outerliner Alloy Cladding |

Example 2. Five-Layer Clad Composite

| Brazing Alloy Cladding |
| --- |
| Interliner |
| Core processed to be highly resistant to recrystallization during braze cycle |
| Outerliner Alloy Cladding |

Example 3. Four-Layer Clad Composite

Figure 1

Table 1: Chemistries of the Alloys used for the Laboratory-Fabricated Composites

| Alloy | Component of Clad Composite | Concentration (wt-%) | | | | | | |
|---|---|---|---|---|---|---|---|---|
| | | Si | Fe | Cu | Mn | Mg | Zn | Ti |
| C305 | Core | 0.15 | 0.25 | 0.18 | 1.55 | 0.03 | 0.05 | 0.02 |
| C817 | Core | 0.30 | 0.65 | 0.19 | 1.15 | 0.01 | 0.05 | 0.05 |
| 0370 | Core | 0.74 | 0.45 | 0.52 | 1.2 | 0.00 | 0.05 | 0.12 |
| 0371 | Core | 0.69 | 0.47 | 0.47 | 1.2 | 0.14 | 0.05 | 0.16 |
| 0372 | Core | 0.69 | 0.45 | 0.58 | 1.2 | 0.24 | 0.05 | 0.16 |
| 0373 | Core | 0.81 | 0.49 | 0.59 | 1.25 | 0.34 | 0.05 | 0.16 |
| 0140 | Interliner | 0.40 | 0.20 | 0.03 | 0.05 | 0.03 | 0.02 | 0.05 |
| 4045 | Brazing Cladding | 9.0 -11.0 | 0.8 | 0.30 | 0.05 | 0.05 | 0.10 | 0.20 |

Figure 2

Table 2: Pre-Braze and Post-Braze Mechanical Properties of the Laboratory-Fabricated Composites

| Sample ID and Pre Braze Cold Work | Core Alloy and Casting Method | Interliner Alloy | Brazing Cladding Alloy | Core Alloy Thermo-Mechanical Practice | Gauge | As-Produced Mechanical Properties | | | Olsen Depth* (in) | Post-Braze Mechanical Properties | | | | | | | | |
|---|---|---|---|---|---|---|---|---|---|---|---|---|---|---|---|---|---|---|
| | | | | | | | | | | Room Temp. Age 0 days | | | RT Age 7 days | | | RT Age 30 days | | |
| | | | | | | TYS (Ksi) | UTS (Ksi) | Elong (%) | | TYS (Ksi) | UTS (Ksi) | Elong (%) | TYS (Ksi) | UTS (Ksi) | Elong (%) | TYS (Ksi) | UTS (Ksi) | Elong (%) |
| B02-0359 | C305 | None | 4045 | Non-Homo | 0.060" | 8.3 | 19.6 | 27.8 | 0.285 | 8.9 | 19.5 | 24.9 | 8.3 | 19.5 | 24.9 | 8.1 | 19.5 | 23.8 |
| 5% | Continuous | | | | 0.050" | 17.3 | 20.4 | 21.0 | | 9.8 | 19.3 | 25.5 | | | | | | |
| 10% | | | | | 0.050" | 20.4 | 21.6 | 14.8 | | 11.3 | 19.8 | 21.2 | | | | | | |
| 15% | | | | | 0.050" | 22.4 | 23.2 | 9.8 | | 8.7 | 17.0 | 14.5 | | | | | | |
| 20% | | | | | 0.048" | 23.8 | 24.6 | 7.6 | | 8.0 | 16.9 | 15.7 | | | | | | |
| 25% | | | | | 0.045" | 25.0 | 25.6 | 5.7 | | 7.8 | 17.6 | 16.9 | | | | | | |
| B02-0360 | C817 | None | 4045 | Non-Homo | 0.060" | 9.7 | 20.4 | 26.2 | 0.265 | 9.1 | 19.4 | 26.4 | 9.2 | 19.5 | 23.8 | 8.8 | 19.7 | 28.3 |
| 5% | Continuous | | | | 0.050" | 17.9 | 21.0 | 10.5 | | 10.5 | 19.2 | 26.4 | | | | | | |
| 10% | | | | | 0.050" | 20.6 | 22.3 | 17.7 | | 12.5 | 19.9 | 21.2 | | | | | | |
| 15% | | | | | 0.050" | 22.5 | 23.8 | 11.1 | | 9.7 | 18.4 | 15.8 | | | | | | |
| 20% | | | | | 0.048" | 24.0 | 25.3 | 10.0 | | 9.1 | 18.1 | 15.1 | | | | | | |
| 25% | | | | | 0.045" | 25.3 | 26.6 | 6.1 | | 8.2 | 18.0 | 16.5 | | | | | | |
| B03-0009 | 0370 | 0140 | 4045 | Non-Homo | 0.060" | 10.0 | 22.6 | 20.0 | 0.305 | 10.1 | 23.3 | 21.0 | 9.8 | 23.3 | 18.8 | 9.4 | 22.9 | 21.0 |
| 5% | Direct Chill | | | | 0.050" | 19.4 | 23.4 | 15.8 | | 11.2 | 22.3 | 20.6 | 12.3 | 22.9 | 14.9 | 11.6 | 22.7 | 16.5 |
| 10% | | | | | 0.050" | 22.5 | 24.6 | 10.4 | | 12.3 | 23.2 | 17.8 | 11.8 | 22.9 | 16.8 | 10.9 | 23.2 | 18.3 |
| 15% | | | | | 0.050" | 24.2 | 25.4 | 6.5 | | 9.1 | 22.5 | 18.8 | 9.6 | 22.9 | 19.1 | 10.0 | 22.8 | 17.8 |
| 20% | | | | | 0.048" | 25.5 | 26.7 | 10.1 | | 8.9 | 22.3 | 20.1 | 9.9 | 22.6 | 20.1 | 9.4 | 22.8 | 20.3 |
| 25% | | | | | 0.045" | 27.2 | 28.0 | 3.6 | | 8.5 | 22.3 | 20.7 | 10.2 | 22.6 | 18.5 | 9.0 | 23.0 | 21.1 |
| B03-0010 | 0371 | 0140 | 4045 | Non-Homo | 0.060" | 11.1 | 23.9 | 16.2 | 0.310 | 10.9 | 24.7 | 17.8 | 10.5 | 24.7 | 18.9 | 10.5 | 24.7 | 18.7 |
| 5% | Direct Chill | | | | 0.050" | 21.5 | 24.6 | 11.5 | | 12.1 | 24.4 | 18.4 | 12.8 | 24.7 | 15.0 | 12.6 | 24.9 | 15.9 |
| 10% | | | | | 0.050" | 25.0 | 25.9 | 6.5 | | 14.2 | 25.3 | 14.7 | 15.3 | 25.4 | 15.1 | 14.6 | 25.5 | 16.5 |
| 15% | | | | | 0.050" | 27.0 | 27.5 | 4.1 | | 12.9 | 25.5 | 15.1 | 10.5 | 24.5 | 19.3 | 13.6 | 25.7 | 17.0 |
| 20% | | | | | 0.048" | 28.6 | 29.0 | 3.7 | | 10.5 | 24.5 | 18.0 | 12.4 | 25.0 | 15.0 | 11.4 | 24.9 | 16.6 |
| 25% | | | | | 0.045" | 29.6 | 30.0 | 3.1 | | 9.3 | 24.2 | 18.3 | 13.8 | 25.5 | 15.3 | 9.9 | 24.4 | 18.3 |
| B03-0011 | 0372 | 0140 | 4045 | Non-Homo | 0.060" | 11.9 | 25.4 | 15.2 | 0.311 | 11.5 | 26.2 | 16.9 | 11.3 | 26.4 | 18.3 | 11.5 | 26.5 | 17.2 |
| 5% | Direct Chill | | | | 0.050" | 23.3 | 26.2 | 11.2 | | 12.9 | 26.3 | 17.2 | 13.7 | 26.3 | 15.5 | 13.0 | 26.5 | 15.0 |
| 10% | | | | | 0.050" | 26.9 | 27.7 | 5.9 | | 15.2 | 27.4 | 15.0 | 15.9 | 27.5 | 14.0 | 15.6 | 27.8 | 14.9 |
| 15% | | | | | 0.050" | 29.0 | 29.4 | 4.3 | | 12.6 | 26.9 | 15.8 | 11.0 | 25.9 | 18.9 | 14.9 | 28.1 | 15.4 |
| 20% | | | | | 0.048" | 30.2 | 30.5 | 3.6 | | 11.2 | 26.0 | 16.7 | 13.0 | 27.0 | 16.0 | 12.7 | 26.9 | 17.5 |
| 25% | | | | | 0.045" | 31.1 | 31.5 | 3.0 | | 10.1 | 25.7 | 18.6 | 14.8 | 27.7 | 13.5 | 10.9 | 26.3 | 17.7 |
| B03-0012 | 0373 | 0140 | 4045 | Non-Homo | 0.060" | 12.3 | 24.9 | 16.2 | 0.300 | 11.4 | 26.6 | 16.9 | 11.7 | 27.6 | 16.9 | 12.8 | 28.9 | 19.4 |
| 5% | Direct Chill | | | | 0.050" | 23.5 | 26.1 | 10.9 | | 13.0 | 27.4 | 18.1 | 14.4 | 28.3 | 15.2 | 15.0 | 29.2 | 16.5 |
| 10% | | | | | 0.050" | 26.8 | 27.4 | 6.0 | | 13.7 | 26.8 | 15.2 | 11.9 | 26.1 | 15.4 | 13.2 | 29.0 | 19.2 |
| 15% | | | | | 0.050" | 28.7 | 29.1 | 3.6 | | 9.7 | 24.6 | 19.5 | 11.4 | 27.6 | 20.0 | 12.1 | 28.7 | 19.5 |
| 20% | | | | | 0.048" | 29.8 | 30.0 | 3.0 | | 9.5 | 24.3 | 19.1 | 10.8 | 25.7 | 20.3 | 12.0 | 28.9 | 20.1 |
| 25% | | | | | 0.045" | 30.8 | 31.1 | 2.8 | | 9.2 | 24.6 | 19.6 | 11.1 | 25.2 | 16.0 | 12.2 | 29.0 | 18.5 |
| B03-0041 | 0372 | None | 4045 | Non-Homo | 0.060" | 12.3 | 26.1 | 15.0 | 0.295 | 11.7 | 27.1 | 15.4 | 11.6 | 27.2 | 14.5 | 12.6 | 27.2 | 15.3 |
| 5% | Direct Chill | | | | 0.050" | 24.3 | 27.0 | 10.6 | | 13.2 | 28.0 | 14.0 | 13.9 | 27.0 | 13.2 | 13.5 | 27.3 | 12.9 |
| 10% | | | | | 0.050" | 27.7 | 28.4 | 5.5 | | 15.4 | 28.3 | 12.9 | 14.8 | 27.0 | 13.4 | 15.9 | 28.4 | 12.5 |
| 15% | | | | | 0.050" | 29.6 | 30.2 | 3.9 | | 13.4 | 27.9 | 13.7 | 11.3 | 26.9 | 16.6 | 16.1 | 28.9 | 12.5 |
| 20% | | | | | 0.048" | 31.0 | 31.4 | 3.4 | | 11.2 | 26.8 | 16.7 | 13.7 | 27.9 | 13.3 | 13.7 | 28.2 | 13.8 |
| 25% | | | | | 0.045" | 32.3 | 32.5 | 2.8 | | 12.1 | 26.8 | 16.9 | 16.2 | 29.0 | 12.6 | 11.4 | 27.1 | 16.5 |

* Olsen depth measured on starting material cold rolled to 0.020-inch thickness and annealed to O-temper Figure 3
Table 3. Compositions of the Components of the Plant-Produced Materials used in the Study

| Material Studied | Component of Clad Composite | Nominal Ratio (%) | Alloy Composition (wt-%) | | | | | | | |
|---|---|---|---|---|---|---|---|---|---|---|
| | | | Si | Fe | Cu | Mn | Mg | Zn | Ti | |
| Non-Homogenized Multiple-Layer 0370 | Brazing Cladding | 7.5 | 7.8 | 0.28 | 0.01 | 0.03 | 0.01 | 0.01 | 0.01 | |
| | Interliner | 3.0 | 0.39 | 0.10 | <0.01 | <0.01 | <0.01 | <0.01 | <0.01 | |
| | Core | Remainder | 0.75 | 0.52 | 0.56 | 1.3 | 0.01 | 0.02 | 0.13 | |
| Homogenized Two-Layer 3003 Core | Brazing Cladding | 10.0 | 7.9 | 0.37 | 0.01 | 0.01 | 0.02 | 0.02 | 0.01 | |
| | Core | Remainder | 0.28 | 0.53 | 0.08 | 1.1 | 0.02 | 0.03 | 0.02 | |
| Homogenized Two-Layer 0370 Core | Brazing Cladding | 8.5 | 10.0 | 0.24 | <0.01 | 0.01 | 0.01 | 0.01 | 0.01 | |
| | Core | Remainder | 0.79 | 0.53 | 0.54 | 1.2 | 0.01 | 0.02 | 0.13 | |

Figure 4

Table 4. Pre-Braze and Post-Braze Mechanical Properties of the Plant-Produced Materials used in the Study

| Material Under Study | Pre-Braze Stretch | Pre-Braze Properties | | | | Post-Braze Properties | | | |
|---|---|---|---|---|---|---|---|---|---|
| | | UTS (ksi) | TYS (ksi) | Elg (%) | Olsen (in) | UTS (ksi) | TYS (ksi) | Elg (%) | Flow (%) |
| Non-Homogenized Three-Layer 0370 Core | 0% | 23.3 | 9.6 | 23.3 | 0.357 | 24.3 | 9.8 | 19.7 | 11.8 |
| | 5% | 24.3 | 21.3 | 16.7 | | 24.8 | 12.5 | 20.2 | 14.0 |
| | 10% | 25.5 | 24.2 | 12.4 | | 23.3 | 10.2 | 13.1 | 5.7 |
| | 15% | 26.7 | 26.0 | 8.4 | | 22.7 | 8.7 | 15.8 | 9.3 |
| | 20% | 28.2 | 28.2 | 5.1 | | 22.8 | 8.6 | 18.5 | 3.2 |
| Homogenized Two-Layer 3003 Core | 0% | 17.1 | 7.2 | 30.0 | 0.383 | 17.8 | 7.8 | 23.7 | 16.3 |
| | 5% | 18.1 | 15.2 | 24.6 | | 16.2 | 6.1 | 22.6 | 6.4 |
| | 10% | 18.8 | 17.0 | 19.9 | | 16.5 | 6.5 | 26.5 | 5.2 |
| | 15% | 19.6 | 18.4 | 16.3 | | 16.6 | 6.5 | 27.2 | 13.9 |
| | 20% | 20.4 | 19.6 | 13.3 | | 16.8 | 6.7 | 26.5 | 16.9 |
| Homogenized Two-Layer 0370 Core | 0% | 22.5 | 10.6 | 26.5 | 0.351 | 23.6 | 9.3 | 22.2 | 56.6 |
| | 5% | 23.6 | 20.2 | 20.9 | | 23.6 | 11.2 | 18.6 | 10.9 |
| | 10% | 24.5 | 23.1 | 13.6 | | 21.2 | 7.8 | 17.2 | 23.4 |
| | 15% | 25.6 | 24.7 | 10.0 | | 22.1 | 8.3 | 20.4 | 43.1 |
| | 20% | 26.7 | 26.5 | 6.6 | | 22.7 | 8.4 | 20.5 | 63.1 |

RECOVERED HIGH STRENGTH MULTI-LAYER ALUMINUM BRAZING SHEET PRODUCTS

CROSS REFERENCE TO RELATED APPLICATION

The present invention claims priority from the provisional patent application entitled: Recovered High Strength Multi-Layer Aluminum Brazing Sheet Products, Ser. No. 60/618,637, which was filed on Oct. 13, 2004. Further, the teachings of that application are fully incorporated into the present application by reference thereto.

FIELD OF THE INVENTION

This invention relates to the field of heat treatable and non-heat treatable aluminum alloy products. In particular, this invention relates to multi-layer brazing sheet products and processes for manufacturing these brazing sheet products. More particularly, the present invention is directed to a brazing sheet product useful for high-strength applications such as heat exchangers.

BACKGROUND OF THE INVENTION

There is an increasing need for the reduction of weight and the reduction in cost for products made from aluminum brazing sheet, particularly for brazing sheet used in heat exchangers, particularly in automotive applications. Brazing sheet products that exhibit higher-post braze yield strengths are desirable, as these high-strength products allow automotive engineers to downgauge. In short, a high strength brazing sheet product would allow the heat exchanger to be made from a thinner and, therefore, lighter brazing sheet, with corresponding weight savings in the overall automotive design.

In addition, it is equally important that the brazing sheet or plate product have adequate corrosion resistance as well as adequate brazeability to allow the heat exchanger manufacturer to reliably braze the heat exchanger.

Ideally, variants of the products also must be brazeable by a variety of brazing methods, most notably, vacuum and flux-based (e.g. CAB or Nocolok™) brazing processes, to have as wide an application as possible.

Although products which exhibit a recovered, but not recrystallized, microstructure are highly desirable from a post-braze yield strength perspective, it is well known that these microstructures are highly susceptible to localized erosion during the brazing cycle. Non-homogenized 3xxx cores, in O-temper, are known to be sensitive to core erosion during brazing. Core erosion is localized melting of the core alloy in contact with the molten 4xxx cladding and generally is deleterious to corrosion resistance and cladding flow (i.e., brazeability). Localized erosion typically results from enhanced Si diffusion from the 4xxx cladding alloy into the underlying base metal in contact with the 4xxx cladding alloy. The dislocation networks (e.g., sub-grain boundaries) present in recovered, but unrecrystallized, microstructures result in demonstrably higher diffusivities for Si. The enhanced mobility of Si in the presence of a fine network of interlacing dislocations results in high local Si concentrations, which, in turn, result in localized melting of the metal in contact with the 4xxx cladding alloys during the brazing cycle. This localized melting of the core alloy enriches the cladding with aluminum, and changes in-situ the cladding alloy's composition and its flow properties. Localized melting can also alter the surface topography of the metal, which generally retards 4xxx cladding flow during the brazing cycle and results in poor brazeability. Lastly, this localized ingress of Si into the core can result in an increased susceptibility to localized corrosion.

SUMMARY OF THE INVENTION

The present invention relates to a selection of core and cladding alloys, cladding thicknesses, and processing routes that, when combined, produce formable, corrosion-resistant aluminum brazing sheet alloy products which exhibit good brazeability, including good cladding flow, with surprisingly low incidence of localized erosion, and which display surprisingly high post-braze tensile strengths immediately after brazing. The invention additionally includes Mg-containing and Mg-free (i.e., less than 0.05 wt-%) variants of brazing sheet products, with differing arrangements and thicknesses of the layers (e.g., a core alloy layer, inter-liner layer, and a cladding layer, such as an Aluminum Association 4343 alloy cladding layer).

The present invention provides a metallurgical product consisting essentially of a core aluminum alloy, purposefully tailored through chemistry and processing route to resist recrystallization during the brazing cycle to exploit the higher strengths immediately after brazing of a deformed and recovered microstructure, bonded on one side to an aluminum alloy interliner designed to be resistant to localized erosion, which, in turn, is bonded to a 4xxx cladding alloy.

In one embodiment, the core alloy has a high volume-fraction of $Al_vMn_wSi_xFe_yNi_z$ particles and/or $Al_x(Zr)_y$ particles less than about 0.1 microns in average diameter. In one embodiment, the core alloy has between about 0.5 wt% and about 1.7 wt% Mn, between 0.1 wt% and about 1.2 wt% Si, less than about 2 wt% Fe, less than about 2.5 wt% Mg, less than about 1.2 wt% Cu, less than about 3 wt% Zn, between 0 and about 0.3 wt% Ti, and less than about 0.3 wt-% Zr with optional additions of less than 0.2 wt% of Ni, V, Cr and Ag allowed but not preferred. In one embodiment, the solute (in weight percent) of the aluminum core alloy satisfies the following equation: ((Mn +Fe +Ti +Cr +V +Zr +Ni)/Si) -((Cu +Mg +Zn)/Si ) 0. In one embodiment, the core alloy has a (Mn+Fe)-to-Si ratio greater than about 1.4. In one embodiment, the core alloy has purposeful additions of Zr to inhibit recrystallization. In one embodiment, the core alloy is purposefully processed to limit exposure of the core alloy to elevated thermal practices beyond that which is required to attain appropriate temperature for hot rolling purposes.

In one embodiment, the interliner is an aluminum alloy with Mg concentration below 0.5 Wt-%, Fe concentration below about 0.8 wt-%, Cu concentration below about 0.5 wt%, Mn concentration below about 1.7 wt%, Cr concentration below about 0.3 wt%, Zn concentration between 0 and about 1.5 wt%, and Zr concentration below about 0.3 wt%, which is processed to be resistant to localized erosion from the 4 xxx cladding alloy during the brazing cycle. In one embodiment, the interliner alloy is sacrificial (i.e., more anodic), electrochemically, to the core alloy. In one embodiment, the interliner is an aluminum alloy with Mg concentration below about 0.07 wt%, Fe concentration below about 0.4 wt%, Cu concentration below about 0.3 wt%, Mn concentration below about 0.3 wt%, Cr concentration below about 0.1 wt%, Zn concentration below about 1.5 wt%, and Zr concentration below about 0.3 wt-%. In one embodiment, the interliner is at least 15 microns thick at final gauge. In one embodiment, the interliner is at least 25 microns thick at final gauge. In one embodiment, the interliner is a 1xxx alloy.

In one embodiment, the metallurgical product of the present invention includes a 4xxx braze cladding having a Si concentration between about 5 and about 16 wt%, Fe concentration of less than about 0.8 wt%, Mn concentration below about 0.5 wt%, Cu concentration below about 0.5 wt%, Zn concentration below about 2.5 wt%, and Mg concentration below about 3 wt-%. In one embodiment, the 4xxx braze cladding has Si concentration between about 6 and about 13 wt%, Fe concentration of less than about 0.4 wt%, Mn concentration below about 0.3 wt%, Cu concentration below about 0.3 wt%, Zn concentration below about 0.3wt%, and Mg concentration below about 1.5 wt-%. In one embodiment, the 4 xxx braze cladding has Si concentration between about 6 and about 13 wt%, Fe concentration of less than about 0.4 wt%, Mn concentration below about 0.3 wt-%, Cu concentration below about 0.2 wt%, Zn concentration below about 0.1 wt-%, and Mg concentration below about 0.05 wt-%.

In one embodiment of the metallurgical product, the opposing side of the core alloy is bonded to an outerliner alloy whose composition has a Mg and/or Zn concentration above that of the core alloy and a solidus temperature above about 550° C. In one embodiment, the opposing side of the core alloy is bonded to an outerliner alloy with a composition having Si between about 0.1 and 1.2 wt%, Fe concentration below about 1 wt%, Mg concentration between about 0.5 and about 2 wt%, Zn concentration less than about 5 wt%, Cu concentration below 0.5 wt%, and Mn concentration less than 1.7 wt-%. In another embodiment, the opposing side of the core alloy is bonded to an outerliner alloy with a composition having Si between about 0.1 and 1.2 wt%, Mn concentration less than about 1.7 wt-%, Fe concentration below about 1 wt%, Mg concentration below about 0.25 wt-%, Cu concentration below about 0.7 wt%, and Zn concentration less than about 2.5 wt%, with Zr additions optional and less than 0.3 wt-%. In one embodiment, the opposing side of the core alloy is bonded to an outerliner alloy with a composition having Si between about 0.05 and 0.9 wt%, Mn concentration less than about 1.2 wt%, Fe concentration below about I wt%, Mg concentration between about 0.25 and 2.5 wt%, Cu Concentration below about 0.3 wt-%, and Zn concentration less than about 4.0 wt%, with Zr additions optional and less than 0.3 wt-%.

In one embodiment, the opposing side of the core alloy is bonded to a second interliner alloy, which, in turn, is bonded to an outerliner alloy. In one embodiment, the thickness of the outerliner is about 25 microns to about 5 mm at final gauge. In one embodiment, the thickness of the outerliner is between about 25 microns arid 5 mm at final product gauge. In One embodiment, the outerliner is electrochemically sacrificial to the core alloy. In one embodiment, the second interliner alloy is an aluminum alloy that is essentially identical in composition to the first interliner. In one embodiment, the second liner is purposefully different in composition and/or process than the first interliner.

In one embodiment, the second interliner is an aluminum alloy with Mg concentration below about 0.4 wt%, Fe concentration below about 0.4 wt%, Cu concentration below about 0.3 wt%, Mn concentration below about 0.3 wt%, Cr concentration below about 0.1 wt%, Zn concentration below about 1.5 wt%, and Zr concentration below about 0.3 wt-%.

In one embodiment, the opposing side of the core alloy is bonded to a second interliner alloy,which, in turn, is bonded to a second 4xxx braze cladding alloy In one embodiment, the second 4xxx braze cladding has Si concentration between about 5 and about 16 wt%, Fe concentration of less than about 0.8 wt%, Mn concentration below about 0.5 wt%, Cu concentration below about 0.5 wt%, Zn concentration below about 2 wt%, and Mg concentration below about 3wt-%. In one embodiment, the second 4xxx braze cladding has Si concentration between about 6 and about 13 wt%, Fe concentration of less than about 0.5 wt%, Mn concentration below about 0.4 wt%, Cu concentration below about 0.3 wt%, Zn concentration below about 2 wt%, and Mg concentration below about 1.5 wt-%. In one embodiment, the second 4xxx braze cladding is essentially identical in composition to the first 4xxx alloy. In one embodiment, the second 4xxx braze cladding is purposefully different in composition to the first 4xxx alloy, in one embodiment, the first and/or second tax cladding is AA4343, AA4045, AA4047, AA4004, AA4 104, AA4 147 or some near compositional variant thereof In one embodiment, the 4xxx cladding(s) and interliners have a Mg concentration below about 0.3 wt-%. In one embodiment, the 4xxx cladding(s) and interliner(s) have a Mg concentration below about 0.05 wt-%. In one embodiment, the ratio of 4xxx braze cladding thickness to interliner thickness is no greater than about 3.5 to I. In one embodiment, one or more alloy layers of the product have an average dendrite arm spacing of 400 microns or less during the casting portion of the production process.

In one embodiment, the product of the present invention is partially or completely fabricated via a SMAC cast process according to U.S. Pat. No. 6,705,384. In one embodiment, the multi-layer product is fabricated using a SMAC cast-based process (according to U.S. Pat. No. 6.705,3 84, wherein the interliner(s) of the claimed invention is (are) the divider sheet(s) or plate(s) employed to separate the molten metal streams during casting) and which is subsequently rolled to gauge. In another embodiment, the product is fabricated using a roll bonding process. In one embodiment, any or all of the 4xxx cladding, interliner, or core alloy are cast with average dendrite arm spacing of 400 microns or less. In one embodiment, the final gauge of the sheet is less than 9 mm. In one embodiment, the core alloy is continuously east.

In one embodiment, the thickness of the outerliner is between about 25 microns and 5 mm at final product gauge. In one embodiment, the outerliner is electrochemically sacrificial to the core alloy.

In another embodiment, the product is fabricated using a roll bonding process. In one embodiment, any or all of the 4xxx. cladding, interliner, or core alloy are cast with average dendrite am-i spacing of 400 microns or less. In one embodiment, the final gauge of the sheet is less than 9 mm. In one embodiment, the core alloy is continuously cast. In one embodiment, the product is age-hardenable after exposure to a brazing cycle.

In one embodiment, die brazing sheet product is provided in an —O, H1X, Hill, H2X, or H3X temper. In one embodiment, the brazing sheet product is provided in a fully-annealed "O" temper. In one embodiment, at least one of the layers are cast in a separate operation and then roll bonded. In one embodiment the product is rolled to thicknesses between about 400 microns and about 9 mm.

In one embodiment, the brazing sheet product is used to make a part of a heat exchanger, for example, a header, side support, manifold, end cap, etc. In one embodiment, ti-ic sheet is used in a heat exchanger. In one embodiment, the sheet is formed inLo a shape, incorporated into a heat exchanger in some manner, and brazed.

In one embodiment, the yield strength of the product immediately after brazing is equal to or greater than about 65 MPa. In one embodiment, the post-braze tensile yield strength exceeds 60 MPa when tested at room temperature immediately after brazing.

The invention is a metallurgical product consisting of, or consisting essentially of, a core aluminum alloy, purposefully tailored through chemistry and processing route to resist recrystallization during the brazing cycle to intentionally exploit the higher strengths immediately after brazing of a deformed and recovered microstructure, the core alloy being bonded on one side to an aluminum alloy interliner designed to be resistant to localized erosion, which, in turn, is bonded to a 4xxx cladding alloy.

In one embodiment of the invention, the brazing sheets incorporate a non-homogenized core. The core alloy has a recovered, in contrast to a substantially or wholly recrystallized, microstructure. In another embodiment of the invention, both the core alloy and at least one of the outerliner layers have a recovered, non-homogenized microstructure.

A critical aspect of the invention is the presence of a high volume-fraction of fine particles that resist recrystallization in these alloys designed to exploit the higher strengths of a recovered microstructure. In dispersion-strengthened alloys (e.g., 3xxx alloys), it is generally desirable to avoid a homogenization practice to keep the volume-fraction of fine particles as high as possible. Careful selection (or purposeful avoidance) of the thermal practices is a critical element in establishing the dispersoid volume fraction and distribution, so, too, is the selection of alloying levels and alloying elements. For example, specific alloying elements such as Zr will also retard recrystallization. A partially or fully recovered microstructure will be significantly stronger, particularly in terms of tensile yield strength, than a fully-recrystallized (annealed) microstructure.

In one aspect of the invention, the core alloy and the 4xxx alloy cladding are separated by an interliner, such that the core is bonded to an interliner that is resistant to recrystallization, and the interliner is, in turn, bonded to the 4xxx alloy. This structure minimizes localized erosion, promotes good brazeability, and, by suitable selection of the interliner alloy, enhances corrosion resistance, such that the interliner alloy sacrificially protects the underlying core alloy.

A further aspect of the invention is that the core alloy and/or outerliner alloy is highly resistant to recrystallization, even in a highly strained, deformed state, during the brazing cycle. This deformation can be introduced naturally during the stamping, drawing, and/or forming operations used to make the parts or can be purposefully introduced into the sheet by the aluminum sheet manufacturer.

BRIEF DESCRIPTION OF THE DRAWINGS

FIG. 1 is a schematic diagram showing the distinct layers of the several variants of multi-layer brazing sheets. It may be appreciated that, for clad composites exhibiting more than one interlayer, the composition and/or cladding ratio of the second interlayer may differ from that of the first interlayer. Further, it may be appreciated that the cladding layer described as the outerliner may consist of a brazing cladding or may consist of a waterside cladding or other aluminum cladding alloy.

FIG. 2 is a table (Table 1) showing the compositions (wt-%) of the core, brazing cladding, and interliner alloys used for the laboratory-fabricated brazing sheet products produced according to the invention.

FIG. 3 is a table (Table 2) showing the pre-braze and post-braze mechanical properties of the laboratory-fabricated brazing sheet products produced according to the invention and summarized in Table 1.

FIG. 4 is a table (Table 3) showing the compositions (wt-%) of the plant-produced brazing sheets produced according to the invention.

FIG. 5 is a table (Table 4) showing the pre-braze and post-braze mechanical properties data for the plant-produced brazing sheets produced according to the invention and summarized in Table 3.

DETAILED DESCRIPTION OF PREFERRED EMBODIMENTS

All elemental concentrations in the alloys herein are by weight percent unless otherwise indicated. As used herein, the term "substantially free" means that no purposeful addition of that alloying element was made to the composition, but that, due to impurities and/or leaching from contact with manufacturing equipment, trace quantities of such elements may, nevertheless, find their way into the final alloy product. In addition, when referring to any numerical range of values, such ranges are understood to include each and every number and/or fraction between the stated range minimum and maximum. A range of about 5 to 15 wt-% silicon, for example, would expressly include all intermediate values of about 5.1, 5.2, 5.3 and 5.5 wt-%, all the way up to and including 14.5, 14.7 and 14.9 wt-% Si. The same applies to each other numerical property, relative thickness, and/or elemental range set forth herein The metallurgical approach to the core alloy is as follows. It has been found that one of the keys to the development of a microstructure that is highly resistant to recrystallization during the brazing cycle of brazing sheet manufacturing is the presence of a significant volume-fraction of fine particles, e.g., dispersoids. The Zener drag pressure exerted by a dispersoid population on a boundary is inversely proportional to the mean diameter of the particles and/or dispersoids and is directly proportional to their volume-fraction. As a result, it is believed that, for any given deformation state, there exists a critical particle diameter above which the particle can serve as a potential nucleation site for recrystallization. In most commercial dispersion-strengthened alloys, there is a population of particles and/or dispersoids above and below this critical mean diameter. Those particles above the critical diameter serve as potential nucleation sites for recrystallization and those below retard grain growth and inhibit recrystallization. Hence, if the goal is to inhibit recrystallization, the ideal microstructure is one which exhibits a high volume-fraction of fine sub-critical particles with high Zener drag, but which contains a minimal number of particles above the critical diameter for the alloy in the deformation state of interest. Ideally, these dispersoids should be stable (i.e., insoluble or minimally soluble) in the core alloy during the brazing cycle employed to braze the part. Elements such as Zr, V, Cr and Ti promote the formation of small dispersoids and inhibit recrystallization to varying degrees, and, as such, are generally desirable at low concentrations in the core alloys of the invention. Particles of $Al_V Mn_W Si_X Fe_Y Ni_Z$, if present, also can inhibit recrystallization, particularly if a significant volume-fraction of them are small, e.g., less than about 1 micron diameter. It should be expressly noted that the Mn, Si, Fe and Ni concentrations in the $Al_V Mn_W Si_X Fe_Y Ni_Z$ particles can vary over a wide range of stoichiometries or can be fully absent from the particles, depending on the alloying levels present in the alloy.

Si concentrations above approximately 0.1 wt-% generally result in increasing volume-fractions of $Al_vMn_wSi_xFe_y$-$Ni_z$ particles which are highly resistant to reversion during the brazing cycles. It is generally preferable to eliminate, or at least minimize, exposure of the core alloy to high temperature thermal treatments (e.g., homogenization, extended exposure to reheat for hot rolling, etc.) during the production of the brazing sheet to keep the highest possible volume-fraction of small dispersoids. Likewise, high solidification rates during casting are desirable because they allow for the introduction of higher volume-fractions of fine dispersoids into the alloy. As such, thin ingots are more desirable than thicker ingots for Direct-Chill casting of core alloys. Continuous casting (e.g., slab casting, twin roll casting, drag casting, etc.) is further preferred, because of the even higher solidification rates attained during continuous casting.

The compositions and processing routes for the core alloys ideally should be selected to generate a high volume-fraction of fine (<1 micron average diameter) particles to make the core alloy resistant to recrystallization during the brazing cycle. Desirable core alloys include 3xxx alloys with Si concentrations above 0.1 wt-%, especially those with high Mn concentration (>0.8 wt-%) and with Si concentrations above 0.5 wt-%. Additions of known recrystallization inhibitors like Zr are also desirable.

This same metallurgical approach can be used for selecting the outerliner alloys in the variants of the invention incorporating an outerliner. An outerliner would be employed if the design of the heat exchanger was such that the one face of the sheet required an alloy whose material characteristics were specifically tailored to its working environment. For example, since the working environment for an evaporator heat exchanger usually is damp and prone to promote corrosion, the outerliner for an evaporator heat exchanger component preferably would consist of an alloy with a high resistance to corrosion.

The core aluminum alloy composition must fall within a range of compositions such that the net concentration of the solute participating in the formation of dispersoids is higher than the net concentration of the solute that does not generally form dispersoids. Preferably, this results in the following relationship holding true:

$$\left(\frac{Mn + Fe + Ti + Cr + V + Zr + Ni}{Si}\right) - \left(\frac{Cu + Mg + Zn}{Si}\right) \geq 0 \quad \text{(equation 1)}$$

Furthermore, it is preferred that the (Mn+Fe)-to-Si ratio in the core alloy be greater than or equal to about 1.5. Note, all alloy concentration values are expressed in wt-%.

It should be noted expressly that some of the above alloying elements can be at low, impurity levels, at undetectable levels, or altogether absent, as long as the relationship described above in equation 1 holds true and as long as a significant population of particles are fine particles. Given cost and general scrap loop considerations, alloying elements like Ni, Cr, and V are typically disfavored, but are perfectly suitable for use in this invention. The thickness of the core alloy at final clad composite gauge can be as little as about 100 microns to as much as about 9 mm.

The 4xxx cladding alloys should contain between about 4 and about 17 wt-% Si, between about 0.01 and about 1 wt-% Fe, up to about 2 wt-% Mg, up to about 2 wt-% Zn, up to about 0.5 wt-% Cu and up to about 0.5 wt-% Mn, up to about 0.2 wt-% In, with the balance of incidental elements and impurities being each at 0.05 wt-% or less, and not more than 0.25 wt-%, combined. The actual compositions will depend on the brazing application and electrochemical potential desired in the cladding alloy. Particularly suitable 4xxx cladding alloys will contain between 6 and 13 wt-% Si, less than 0.5 wt-% Fe, less than 0.15 wt-% Mn, and less than 0.3 wt-% Cu, with the Mg concentrations dependent upon and tailored to the brazing method being employed (vacuum or flux-brazed), and the Zn and/or In concentration tailored to effect a desired electrochemical potential within and adjacent to the brazing joint. It should also be noted that, in products requiring that both outer surfaces be clad with 4xxx alloys, the most typical application would have similar 4xxx alloys; however, the selection of the 4xxx cladding alloy is dependent on the brazing method employed and the design of the final part being brazed. The thickness of the 4xxx cladding alloys can range from as little as about 15 microns to as about 250 microns at the final gauge of the clad product.

The outerliner alloy as depicted in FIG. 1, (e.g., in variant 3) would generally be an alloy tailored to provide high corrosion resistance in the environment to which that face of the sheet is exposed and/or an alloy with elevated Mg concentration (relative to the core alloy) to provide even higher strength, if the application, part design, and brazing process allowed. One typical consideration in the claimed compositions is that the composition of the outerliner alloy be such that the Mg and/or Zn concentration be greater than that of the core alloy chosen for the specific application. This alloy should also have a solidus value in excess of 550° C., preferably above 580° C. At final brazing sheet gauge, the outerliner should be at least about 15 microns thick, preferably between about 15 and about 350 microns in thickness.

For many applications, it may be desirable for the aluminum producer to provide the brazing sheet product in a non-fully-annealed temper to obtain the full benefit of strengthening in the post brazed part. The summation of strain imparted into the material at both the aluminum brazing sheet producer and the part fabricator must be less than the critical amount of strain needed for complete recrystallization in the core alloy of the invention after brazing to receive some benefit from the strengthening associated with a recovered microstructure. As such, various tempers may be purposefully developed for brazing sheet material destined for specific parts to be fabricated from the brazing sheet to maximize post-braze yield strength within said part.

FIG. 1 depicts various possible combinations of core, claddings, and interliners. As depicted, the brazing sheet product may be comprised of three, four, or five distinct layers. One of the outer layers for the three-layer products would be a 4xxx alloy cladding. The four- and five-layer products would have at least one 4xxx alloy outer layer, but perhaps two, 4xxx alloy outer layers. The interliner, resistant to recrystallization, is bonded between the core and the 4xxx alloy cladding and/or between the core and the outerliner.

The ability to achieve high post-braze strength relies on the use of a non-homogenized, high-Si (>0.2. wt-%) 3xxx alloy core, separated from the 4xxx alloy braze cladding(s) by an interliner. Again, because non-homogenized 3xxx alloy cores (that recover) are sensitive to core erosion (localized melting of the core alloy in contact with the molten 4xxx cladding) during brazing, 3xxx core alloys typically are homogenized for products requiring significant formability (generally those products requiring O-temper).

Homogenization (a high temperature [>450 C] thermal treatment for more than about 3 hrs) generally improves formability. Core erosion generally is deleterious to corrosion resistance and cladding flow (i.e., brazeability). The use, under the patent, of an interliner protects the non-homogenized core alloy from coming into contact with the molten 4xxxx alloy cladding during the brazing process. In this way, use of a recovered microstructure with a high volume-fraction of fine $Al_wMn_xSi_yFe_z$ particles is possible. Furthermore, by selecting a high-Si 3xxx core alloy, the AlMnSiFe particles do not revert during the brazing process. As such, these fine particles are able to help inhibit recrystallization and promote a recovered, rather than recrystallized, microstructure. This recovered microstructure has significantly higher TYS and UTS values, while maintaining good formability. This approach has allowed for post-braze TYS values in excess of 85 MPa and post-braze UTS values in excess of 160 MPa, even in Mg-free alloys. The foregoing TYS compares favorably to a maximum TYS of about 68 MPa for the same core alloy in the homogenized condition. If the brazing process and the part/joint geometry can tolerate higher Mg concentrations in the core alloy, higher post-braze properties are possible with Mg additions to the core alloy.

FIG. 2 (Table 1) is a table of the compositions of the alloys used in the various laboratory-fabricated composites evaluated in this study.

FIG. 3 (Table 2) is a table of pre-braze and post-braze mechanical properties for the laboratory-fabricated composites, as a function of applied pre-braze cold work.

Samples of later plant-produced variants consisting of a core, an interliner, and a cladding of 4045 alloy were tested in the as-produced condition and after having been plastically stretched 5%, 10%, 15%, and 20%. As used herein, a sample stretched X% means that, after stretching, the sample is 100%+X% of the original length.

FIG. 4 (Table 3) displays the alloy compositions and their functions in the plant-produced clad composites used in this study.

FIG. 5 (Table 4) presents pre-braze and post-braze mechanical properties for the plant-produced materials used in this study.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention, which is to be given the full breadth of the appended claims and any and all equivalents thereof.

Having described the presently preferred embodiments, it is to be understood that the invention otherwise may be embodied within the scope of the appended claims.

What is claimed is:

1. A metallurgical product comprising:
   a non-homogenized core comprising of an Aluminum Association 3xxx series alloy having a (Mn+Fe) to Si ratio greater than about 1.4, the non-homogenized core having Al—Mn—Si—Fe—Ni particles being less than about 0.1 microns in average diameter, wherein the solute (in weight percent) of the non-homogenized core satisfies the following equation:

$$\left(\frac{Mn+Fe+Ti+Cr+V+Zr+Ni}{Si}\right)-\left(\frac{Cu+Mg+Zn}{Si}\right) \geq 0;$$

an aluminum alloy interliner bonded to one side of the non-homogenized core having a composition resistant to localized erosion; and a 4xxx cladding alloy bonded to the aluminum alloy interliner.

2. The metallurgical product of claim 1, wherein the non-homogenized core comprises an Aluminum Association 3XXX series alloy comprising greater than about 0.1 wt. % Si.

3. The metallurgical product of claim 1, wherein the non-homogenized core comprises 0.5 wt. % and about 1.7 wt. % Mn, between 0.1 wt. % and about 1.2 wt. % Si, less than about 2 wt. % Fe, less than about 2.5 wt. % Mg, less than about 1.2 wt. % Cu, less than about 3 wt. % Zn, between 0 and about 0.3 wt. % Ti, less than about 0.3 wt. % Zr.

4. The metallurgical product of claim 1, wherein the non-homogenized core comprises an Aluminum Association 3XXX series alloy comprising a Mn concentration greater than about 0.8 wt. % and a Si concentration greater than about 0.5 wt. %.

5. The metallurgical product of claim 1, wherein the non-homogenized core further comprises Ni, Cr, V, or a combination thereof.

6. The metallurgical product of claim 1, wherein the non-homogenized core has purposeful additions of Zr to inhibit recrystallization.

7. The metallurgical product of claim 1, wherein the non-homogenized core has a thickness of about 100 microns to about 9.0 mm.

8. The metallurgical product of claim 1, wherein the interliner is an aluminum alloy comprising about 0.4 wt. % Si, about 0.20 wt. % to about 0.10 wt. % Fe, about 0.03 wt. % to about 0.01 wt. % Cu, about 0.05 wt. % Mn to about 0,01 wt. % Mn, about 0.03 wt. % to about 0.01 wt. % Mg, less than about 0.02 wt. % Zn, and about 0.05 wt. % to about 0.01 wt. % Ti.

9. The metallurgical product of claim 1, wherein the interliner is an aluminum alloy comprising about 0.4 wt. % Si, about 0.20 wt. % Fe, about 0.03 wt. % to about 0.01 wt. % Cu, about 0.05 wt. % Mn to about 0.01 wt. % Mn, about 0.03 wt. % Mg, about 0.02 wt. % Zn, and about 0.05 wt. % Ti.

10. The metallurgical product of claim 1, wherein the interliner is an aluminum alloy comprising about 0.40 wt. % Si, about 0.10 wt. % Fe, less than about 0.1 wt. % Cu, less than about 0.01 wt. % Mn, less than about 0.01 wt. % Mg, less than about 0.01 wt. % Zn, and less than about 0.01 wt. % Ti.

11. The metallurgical product of claim 1, wherein the interliner is an aluminum alloy with Mg concentration below 0.5 wt%, Fe concentration below about 0.8 wt-%, Cu concentration below about 0.5 wt%, Mn concentration below about 1.7 wt-%, Cr concentration below about 0.3 wt-%, Zn concentration between 0 and about 1.5 wt-%, and Zr concentration below about 0.3 wt-%.

12. The metallurgical product of claim 1, wherein the interliner is an aluminum alloy with Mg concentration below about 0.07 wt-%, Fe concentration below about 0.4 wt%, Cu concentration below about 0.3 wt%, Mn concentration below about 0.3 wt-%, Cr concentration below about 0.1 wt%, Zn concentration below about 1.5 wt-%, and Zr concentration below about 0.3 wt-%.

13. The metallurgical product of claim 1, wherein the interliner is a 1xxx alloy.

14. The metallurgical product of claim 1, wherein the interliner alloy is sacrificial electrochemically to the non-homogenized core.

15. The metallurgical product of claim 1, wherein the product is partially or completely fabricated via a multi-alloy casting processes.

16. The metallurgical product of claim 1, wherein the final gauge of the sheet is less than 9 mm.

17. The metallurgical product of claim 1, wherein the 4xxx braze cladding comprises about 4.0 wt. % to about 17.0 wt. % Si, about 0.01 wt. % to about 1.0 wt. % Fe, up to about 0.5 wt. % Mn, up to about 0.5 wt. % Cu, up to about 2.0 wt. % Zn, up to about 2.0 wt. % Mg, and up to about 0.2 wt. % In.

18. The metallurgical product of claim 1, wherein the 4xxx braze cladding comprises about 6 wt. % and about 13 wt. % Si, less than about 0.5 wt. % Fe, less than about 0.15 wt. % Mn, and less than about 0.3 wt. % Cu.

19. The metallurgical product of claim 1, wherein the 4xxx braze cladding is Aluminum Association 4343 alloy.

20. The metallurgical product of claim 1, wherein the 4xxx braze cladding has a thickness of about 15 microns to about 250 microns.

21. The metallurgical product of claim 1, further comprising an outerliner bonded to a side of the non-homogenized core opposing the interliner and braze cladding, wherein the outerliner comprises an alloy comprising a composition including Mg or Zn in a concentration above that of the non-homogenized core and a solidus temperature above about 550° C.

22. The metallurgical product of claim 1, wherein the opposing side of the non-homogenized core is bonded to an outerliner alloy with a composition having Si between about 0.1 and 1.2 wt. %, Fe concentration below about 1 wt. %, Mg concentration between about 0.5 and about 2 wt. %, Zn concentration less than about 5 wt. %, Cu concentration below 0.5 wt. %, and Mn concentration less than 1.7 wt. %.

23. The metallurgical product of claim 1, wherein the thickness of the outerliner is between about 15 microns and about 350 microns.

24. The metallurgical product of claim 21, further comprising a second interliner between the outerliner and the non-homogenized core.

25. The metallurgical product of claim 1, wherein the metallurgical product is a brazing sheet product is "O" temper.

26. The metallurgical product of claim 1, wherein the product is age-hardenable after exposure to a brazing cycle.

27. The metallurgical product of claim 1, wherein the brazing sheet product is used in a heat exchanger.

28. The metallurgical product of claim 1, comprising a post braze tensile yield strength (TYS) of greater than about 85 MPa and an ultimate tensile strength (UTS) of greater than about 160 MPa.

* * * * *

UNITED STATES PATENT AND TRADEMARK OFFICE
CERTIFICATE OF CORRECTION

PATENT NO. : 7,374,827 B2
APPLICATION NO. : 11/248531
DATED : May 20, 2008
INVENTOR(S) : Raymond J. Kilmer It is certified that error appears in the above-identified patent and that said Letters Patent is hereby corrected as shown below:

On the Title Page, item (57); under ABSTRACT, line 8, after "4xxx", delete "calling" and insert --cladding--.

In column 2, line 44, before "0", add --≥--.

In column 2, line 44, after "O.", delete "Tn" and insert --In--.

In column 3, line 15, before "and", delete "0.3 Wt%" and insert --2 Wt%--.

In column 3, line 44, after "Cu", delete "Concentration" and insert --concentration--.

In column 3, line 52, after "microns", delete "arid" and insert --and--.

In column 3, line 53, after "In", delete "One" and insert --one--.

In column 4, line 17, after "AA4004,", delete "AA4 104" and insert --AA4104--.

In column 4, line 17, after "AA4 104", delete "AA4 147" and insert --AA4147--.

In column 4, line 33, before "wherein", delete "6.705,3 84," and insert --6,705,384,--.

In column 4, line 42, after "continuously", delete "east" and insert --cast--.

In column 4, line 49, after "4xxx", delete ".".

In column 4, line 56, after "H1X," delete "Hill" and insert --H111,--.

In column 4, line 64, after "embodiment" delete "ti-ic" and insert --the--.

In column 4, line 66, after "formed", delete "inLo" and insert --into--.

UNITED STATES PATENT AND TRADEMARK OFFICE
CERTIFICATE OF CORRECTION

| | | |
|---|---|---|
| PATENT NO. | : 7,374,827 B2 | |
| APPLICATION NO. | : 11/248531 | |
| DATED | : May 20, 2008 | |
| INVENTOR(S) | : Raymond J. Kilmer | |

It is certified that error appears in the above-identified patent and that said Letters Patent is hereby corrected as shown below:

In column 10, lines 37-43, delete Claim 8 in its entirety and insert
--8. The metallurgical product of Claim 1, wherein the interliner is an aluminum alloy comprising about 0.4 wt. % Si, about 0.10 wt. % to about 0.20 wt. % Fe, about 0.01 wt. % to about 0.03 wt. % Cu, about 0.01 wt. % Mn to about 0.05 wt. % Mn, about 0.01 wt. % to about 0.03 wt. % Mg, less than about 0.02 wt. % Zn, and about 0.01 wt. % to about 0.05 wt. % Ti.--.

In column 10, lines 44-49, delete Claim 9 in its entirety and insert
-- 9. The metallurgical product of Claim 1, wherein the interliner is an aluminum alloy comprising about 0.4 wt. % Si, about 0.20 wt. % Fe, about 0.01 wt. % to about 0.03 wt. % Cu, about 0.01 wt. % Mn to about 0.05 wt. % Mn, about 0.03 wt. % Mg, about 0.02 wt. % Zn, and about 0.05 wt. % Ti.--.

In column 10, lines 56-62, delete Claim 11 in its entirety and insert
--11. The metallurgical product of Claim 1, wherein the interliner is an aluminum alloy with Mg concentration below 0.5 wt. %, Fe concentration below about 0.8 wt. %, Cu concentration below about 0.5 wt. %, Mn concentration below about 1.7 wt. %, Cr concentration below about 0.3 wt. %, Zn concentration between 0 and about 1.5 wt. %, and Zr concentration below about 0.3 wt. %.--.

In column 10, lines 63-67, and column 11, lines 1-2, delete Claim 12 in its entirety and insert
--12. The metallurgical product of Claim 1, wherein the interliner is an aluminum alloy with Mg concentration below about 0.07 wt. %, Fe concentration below about 0.4 wt. %, Cu concentration below about 0.3 wt. %, Mn concentration below about 0.3 wt. %, Cr concentration below about 0.1 wt. %, Zn concentration below about 1.5 wt. %, and Zr concentration below about 0.3 wt. %.--.

UNITED STATES PATENT AND TRADEMARK OFFICE
CERTIFICATE OF CORRECTION

PATENT NO. : 7,374,827 B2
APPLICATION NO. : 11/248531
DATED : May 20, 2008
INVENTOR(S) : Raymond J. Kilmer It is certified that error appears in the above-identified patent and that said Letters Patent is hereby corrected as shown below:

In column 11, line 19, line 2 of claim 18, after "comprises", insert --between--.

In column 12, line 19, line 2 of Claim 25, after the second occurrence of "is", delete " "O" " and insert --"0"--.

Signed and Sealed this

Twenty-sixth Day of August, 2008

JON W. DUDAS
*Director of the United States Patent and Trademark Office*